United States Patent [19]
Bloom

[11] Patent Number: 6,005,932
[45] Date of Patent: Dec. 21, 1999

[54] DYNAMIC SCHEDULE PROFILER FOR ACD

[75] Inventor: Joseph Bloom, Libertyville, Ill.

[73] Assignee: Rockwell Semiconductor Systems Inc., Newport Beach, Calif.

[21] Appl. No.: 08/998,127

[22] Filed: Dec. 24, 1997

[51] Int. Cl.⁶ .................................................. H04M 3/00
[52] U.S. Cl. ............................................. 379/265; 379/34
[58] Field of Search ........................... 379/34, 113, 265, 379/266, 267, 309

[56] References Cited

U.S. PATENT DOCUMENTS

| | | |
|---|---|---|
| 4,289,934 | 9/1981 | Pitroda et al. . |
| 5,268,903 | 12/1993 | Jones et al. ........................... 370/110.1 |
| 5,335,269 | 8/1994 | Steinlicht ................................. 379/266 |
| 5,384,841 | 1/1995 | Adams et al. ........................... 379/266 |
| 5,469,504 | 11/1995 | Blaha ....................................... 379/265 |
| 5,544,232 | 8/1996 | Baker et al. ............................. 379/265 |

*Primary Examiner*—Paul Loomis
*Attorney, Agent, or Firm*—Welsh & Katz, Ltd.

[57] ABSTRACT

A method and apparatus are provided for scheduling agents supporting operation of an ACD. The method includes the steps of establishing a scheduling period and identifying a plurality of agents to the ACD for supporting the operation of the ACD during the scheduling period. The method further includes the step of applying a generally periodic deviation schedule of an agent of the plurality of agents to the scheduling period which generally periodic deviation schedule is periodic over a plurality of days of the scheduling period.

27 Claims, 3 Drawing Sheets

DYNAMIC SCHEDULE PROFILER FOR ACD

FIELD OF THE INVENTION

The field of the invention relates to automatic call distributors and more particularly to method and apparatus which schedule agents of the automatic call distributor.

BACKGROUND OF THE INVENTION

Automatic call distribution systems are known. Such systems are typically used in an organizational context as a means of distributing telephone calls among a group of agents of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are consider equal, the ACD may distribute the calls based upon which agent position (telephone) has been idle the longest.

In order to ensure the smooth operation of ACDs, an adequate number of agents must be made available to handle customer calls. To this end, work schedules of agents are often established weeks in advance and are automated by the processor of the ACD. Once the work schedule is established, the processor may determine adherence to the work schedule by monitoring the work activity of each agent.

In order to function in his assigned role, an agent must first sign-on to the ACD system. Signing-on may include activating a workstation of the agent and entering an identifier of the agent through the agent's workstation. Often a password is required to complete the sign-on procedure.

Signing-on and signing-off may be required several times per day. In addition to signing-on at the beginning of a work shift an agent may be required to sign-off during lunch and rest breaks. When returning to the workstation, the agent again may be required to sign-on. A processor within the ACD may monitor sign-on and sign-off activity for compliance to the work schedule.

In order to encourage adherence to the work schedules each agent may be allowed to deviate from the work schedule by certain limited time periods. For example, an agent whose workstation is distant from a lunchroom or lavatory facility may be allowed more time to walk from his workstation to central facilities than an agent adjacent such facilities. Agents who must change workstations during a work shift may be allowed a certain amount of time to walk from one workstation to another.

The deviation which a particular agent is allowed from the work schedule is established for each agent and stored in a deviation profile for the agent. The deviation profile may be stored in a database for the ACD along with other agent information such as agent proficiencies used in the call assignment process. Once established, a deviation profile may remain constant for weeks, months or years, or until a need for change arises.

In setting up a work schedule, a supervisor invokes a scheduling routine on a processor of the ACD. Upon determining a number of agents needed for each day, the supervisor may identify the agents to the processor by entering an identifier of each agent. Upon entering an identifier of each agent, the processor may import a set of agent characteristics from the agent file into the scheduling and call assignment programs, including the deviation profile.

While the existing method of scheduling ACD operation is relatively satisfactory, it is also relatively inflexible. Since the deviation profile is directed to structural impediments (e.g., walking distance to a lunchroom or between workstations), it is not easily adapted to the needs of individual agents or their lifestyles. Accordingly, a need exists for a more flexible means of accommodating repetitive scheduling conflicts which is easily adapted for individual agents.

SUMMARY

A method and apparatus are provided for scheduling agents supporting operation of an ACD. The method includes the steps of establishing a scheduling period and identifying a plurality of agents to the ACD for supporting the operation of the ACD during the scheduling period. The method further includes the step of applying a generally periodic deviation schedule of an agent of the plurality of agents to the scheduling period which generally periodic deviation schedule is periodic over a plurality of days of the scheduling period.

DETAILED DESCRIPTION OF AN EMBODIMENT

Figure 1:
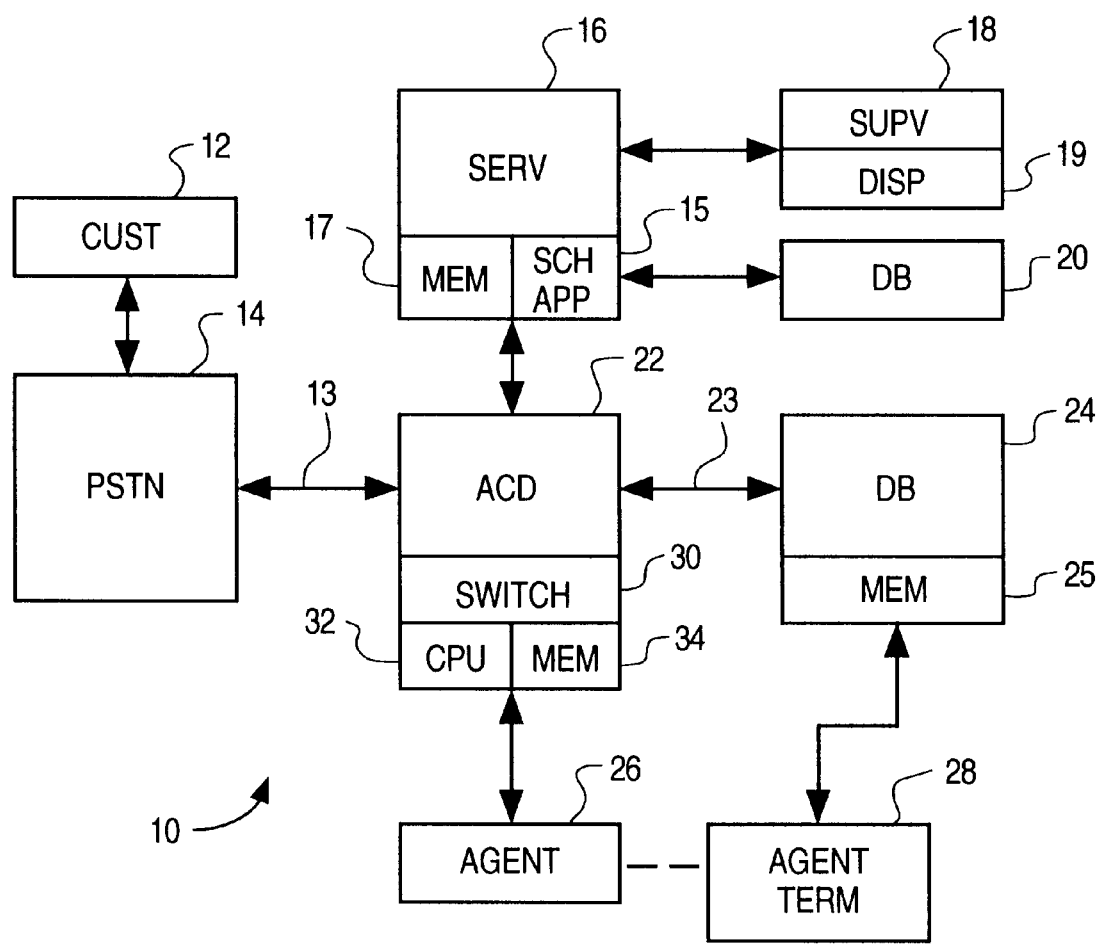
FIG. 1 depicts a block diagram of an automatic call distribution system in accordance with an embodiment of the invention.

FIG. 1 is a block diagram of an automatic call distribution system (ACD) 10, generally, in accordance with an embodiment of the invention. Under the embodiment, the system 10 includes an ACD 22, a server 16 and a host database 24.

The ACD 22 functions to receive and distribute calls received through the PSTN 14 from a number of customers 12 to any of a number of agent telephones 26. In addition to delivering calls, the ACD 22 and host 24 may also deliver customer records to agents through an associated agent terminal 28.

The ACD 22 may communicate with its peripheral devices (e.g., the server 16, database 24, etc.) under an IBM OS/9 format. The agent terminals 28 may also communicate with the database 24 under an OS/9 format.

The server 16 may be provided for maintenance and control of the ACD 22. The server 16 and its peripheral devices (e.g., supervisors terminal 18 and local database 20) may operate as a local area network (LAN) under a TCP/IP format and provide an interface between the supervisors terminal 18 and the ACD 22.

A number of the systems 10 may be located at geographically diverse locations and may be interconnected one-to-another by an appropriate interconnecting group of private lines (e.g., leased lines, virtual private lines, microwave links, dedicated Tl lines, etc.). Similarly, the ACD 22 may be interconnected with a local or geographically distant host 24 through an appropriate data link 23 (e.g., leased lines, virtual private lines, microwave link, the Internet, digital packet switching, etc.).

The server 16 and supervisor terminal 18 may be used to develop and control call handling routines used by a CPU 32 of the ACD 22. The supervisor terminal 18 may also be used to identify a list of agents to the CPU 32 that may receive calls from customers 12 at any given instant of time.

The ACD system 10 may be connected to the PSTN 16 through a number of trunk lines 13. The PSTN 16 may offer service on the trunk lines 13 in association with auxiliary services such as ANI and DNIS. Call control, call maintenance, and call set-up may be accomplished by in-band signalling over the trunk line itself or over an associated control channel.

DNIS information supplied by the PSTN 14 is useful to an ACD system 10 where inbound calls may be directed to any of a large block of telephone numbers assigned to the ACD system 10. This may also be useful where the block of numbers to the ACD system 10 is connected through the trunk lines 13 in rotary fashion, so that when the calling party from the PSTN appears, for example, on trunk T1, it can be determined whether the calling party was, in fact, calling the telephone number corresponding to trunk T1 or was, in fact, calling the telephone number corresponding to trunk T2 and was rotated down to the next available trunk, T1.

With regard to inbound calls, the switch 30 of the ACD system 10 functions to selectively interconnect calls from external customer units 12 of the external PSTN 14 to agents 26 associated with the ACD system 10.

Each of the agents may be provided with an agent telephone (e.g., a telephone handset 26), which, in turn, may be connected to a particular port of the switch 30 of the ACD 22. While the agents may be shown in FIG. 1 in terms of a single agent, it is to be assumed that the agent position 26, 28 may be one of many agent positions associated with a particular ACD system 10.

The switch 30 of the ACD 22 may be controlled by a central processing unit, or CPU 32, in conjunction with a peripheral memory device 34. Control of the switch 30 and communications with the host 24 and PSTN 14 may be accomplished generally as described in U.S. Pat. No. 5,268,903, and U.S. Pat. No. 5,140,611, both to Jones, and both incorporated herein by reference. Routing of calls to agents 26 and overflow of calls may be accomplished generally as described in: U.S. Pat. No. 5,335,269 to Steinlicht et al.; U.S. Pat. No. 5,365,581 to Baker et al.; and U.S. Pat. No. 5,384,841 to Adams et al., all incorporated herein by reference.

During operation, the CPU 32 monitors each port of the switch 30 for changes in status. A change in status may be an agent unit 26 going off-hook to make a call, an agent unit 26 hanging up after a call, or it may be a call alerting tone detected on a trunk 13 alerting the CPU 32 to the presence of an incoming call.

Where the status change is an agent 26 hanging up, the CPU 32 acts to tear-down the call connection within the switch 30 between the agent at a first port of the switch and a second party to the conversation, communicating through a second port of the switch 30. Upon tear down of the connection, the CPU 32 also sends a message to the host 24, notifying the host of termination of the call connection. The message to the host 24 would include at least the identity of the agent 26.

Where the status change is an agent 26 going offhook, the CPU 32 interprets such change as preparation for the placement of a telephone call. As such, the CPU 32 prepares to receive a set of dialed digits. Upon receiving the digits and if the digits are determined as being a call directed to an outside party, then the CPU 32 may seize an outgoing trunk line 13 and send a call alert followed by the dialed digits.

Where the alert is answered by a call connection acknowledgment, the CPU 32 completes the connection between the port of the agent 26 and the port of the seized trunk line.

If the call is directed to another agent 26 or some other party within the organization, then the CPU 32 may identify the port to which the calling party is to be connected by reference to a look-up table within memory 34. Upon locating the party, the CPU 32 may then cause a connection to be set-up between appropriate ports within the switch 30 between the calling and called party.

Where the status change is a call alert signal on an incoming trunk line (or control channel associated with the incoming trunk line), then the CPU 32 may send an acknowledge message to the PSTN 14 accepting the call. The PSTN 14 may respond by forwarding DNIS and ANI information, identifying the called and calling party.

Upon accepting the call, the CPU 32 first stores the DNIS and ANI numbers in a termination table of the memory 34. More specifically, the CPU 32 maintains a table of call information for each port of the switch 30. Where a call is accepted on an incoming trunk line, the CPU 30 enters the DNIS and ANI number into the table for the incoming trunk line upon which the call is received.

In addition to updating the termination table within memory 34, the CPU 30 also generates a call identifier (also sometimes referred to as a call ID or sequence number) for the call, unique to the ACD system 10. The call identifier along with the ANI and DNIS numbers may then be sent to the host 24 as part of a call arrival message. Delivery of the ANI and DNIS numbers and call identifier allows the host 24 to create a unique call record for the call in memory 25, in a call record area of memory 25 reserved for the switch 30. The call record may be used to retrieve customer records for delivery to an appropriate display terminal 28 once the call has been assigned to an agent 26.

The CPU 32 then, by reference to the DNIS number, determines the identity of agent 26 to which the call is to be directed. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

Upon determining the identity of the agent 26 (or group of agents) the CPU 32 instructs the switch 30 to internally connect the port of the incoming trunk to a port of one of the identified agents.

Where the call has been connected to an agent, the CPU 32 stores the port number of the identified agent in the termination table for the port of the incoming trunk. Likewise, the CPU 32 stores the port identifier of the incoming trunk in the termination table of the identified agent.

To complete set-up of the call to the identified agent, the CPU 32 sends a call completion message to the host 24. The call completion message includes at least a port identifier of the identified agent and the call identifier. The information of the call completion message is stored in the call record previously created in conjunction with arrival of the call. The port identifier and call identifier allows the host 24 to deliver customer data to the specific display terminal 28 of the agent to which the call was delivered.

In the alternative, if all of the agents 26 were busy, then an incoming call (e.g., received on incoming trunk T1 of the ACD) 22 would be placed in a queue. While in the queue, the CPU 32 would compare certain parameters of each call in the queue (e.g., time in the queue) with a set of overflow threshold values. Where the parameters of the queued call exceed one or more of the overflow threshold values, the call may be considered a candidate for overflow to another switch, or another agent 26.

In order for the ACD system 10 to function efficiently in the distribution of calls to agents 26, a list of agents must be provided to the ACD 22. The list of agents, in turn, may be generated by an agent scheduling routine operating either from within the ACD 22 or server 16.

Where a separate server 16 is provided as shown in FIG. 1 then the agent scheduling routine would typically reside within and operate from the server 16. Where a separate server is not provided, then the agent scheduling routine would be expected to operate from within the CPU 32 of the ACD 22 with the supervisors terminal 18 connected directly to the ACD 22.

One of the features of the illustrated embodiment of the invention is the ability to create a generally periodic deviation schedule for an agent for individual days of the week or month or year. For example, an agent who may also be a parent may be required to take his children to day care in the early morning every Tuesday. The creation of a separate deviation schedule for every Tuesday may be used to allow the agent to arrive at his workstation later than usual for that day without triggering the display of an unauthorized deviation for the agent at the supervisor's workstation 18 for those days.

Under the embodiment, the supervisor may accommodate the lifestyle of any particular agent through the entry of exception deviation profiles for one or more days of a scheduling period through the supervisor terminal 18. Exception deviation profiles differ from default deviation profiles in that a default deviation profile is general in nature and may be used on a daily basis, whereas exception deviation profiles are exceptions to the daily profile and are periodic over many days, or over the entire scheduling period.

Further, the exception deviation profile may be used in conjunction with the default profile to accommodate idiosyncracies of the agent's lifestyle. For example, the default deviation profile may be used to accommodate structural limitations in the agents work environment, such as distance between workstations, or between a workstation and comfort facilities. Exception deviation profiles may be used to accommodate late start times, or early quitting times, or periodic absences from the workplace during the workday.

Deviation profiles may be created by a supervisor through the supervisors terminal 18. Once created, a deviation profile may be stored in an agent's files, either in the ACD database 24 or the server database 20.

Figure 3:
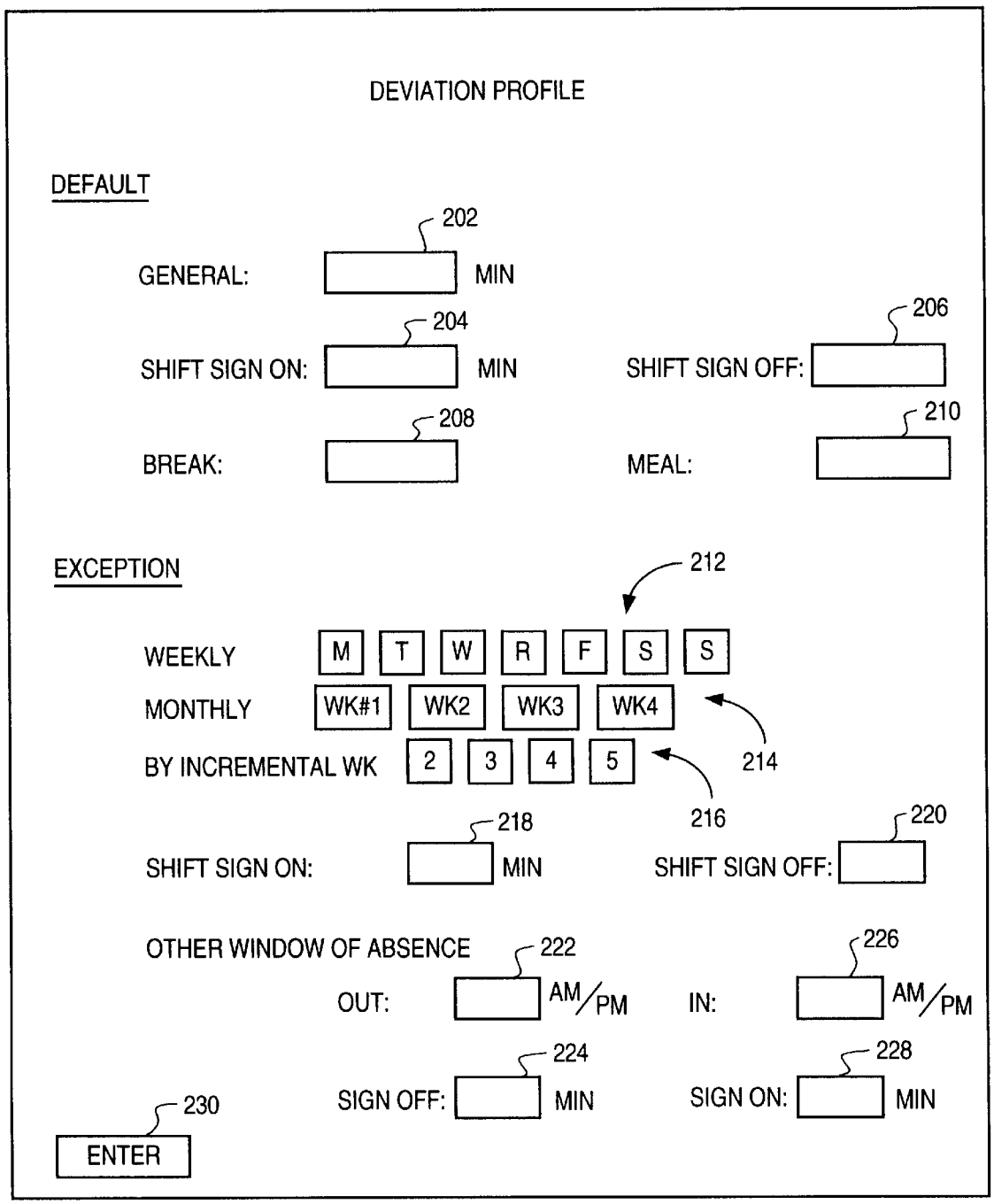
FIG. 3 depicts an example of a display window for use by the system of FIG. 1.

Default and exception deviation profiles may be created under any of a number of different methodologies. Under one embodiment, a deviation entry window 200, such as that shown in FIG. 3, may be used for the generation of agent deviation profiles.

Under the embodiment, information may be entered using the window 200 under any of a number of priorities. For example, deviation entries into the section labeled "EXCEPTION" would be given a higher priority than data entered into the section labeled "DEFAULT".

Entry of a deviation time into the box 202, labeled "GENERAL" may be given the lowest level of priority. If a value of 5 (i.e., 5 minutes) where entered into box 202 and no entries were made in any of the other boxes of the window 200, then a deviation of 5 minutes would be allowed in all cases. For example, if the agent were 5 minutes too early or too late in signing in, signing out, leaving for or returning from lunch or break, then a notice of unauthorized deviation would be generated and added to a list at the supervisor station 18.

Where another deviation value (e.g., 10 min) were entered in the meal box 210, then the value in the meal box 210 would take priority over the value in the general box 202. In this case, shift sign-on and off and sign-on and sign-off for breaks would be given a 5 minute window and sign-on and sign-off for a meal break would be given a 10 minute window on each side of a scheduled value.

Where a deviation is to be entered under exceptions, the supervisor must first identify the periodic interval. For example, the supervisor may click on one or more days of the week in the weekly box 212. Alternatively, the supervisor may click on one or more weeks of the month in the monthly box 214 or an incremental number of weeks in the incremental week box 216.

By an appropriate selection of boxes 212, 214, 216, the supervisor may be able to select a periodic interval suitable for the lifestyle of a particular agent. To complete the exception deviation profile, the agent next selects the type of exception to be permitted. For example, if the exception is to be a late start time at a beginning of a work shift, then the supervisor clicks on the shift sign-on box 218 and enters a time value. If the exception is to be an early quitting time, then the 20 supervisor clicks on the shift sign-off box 220 and enters a time value in that box 220.

To accommodate absences during a regular work shift, the supervisor may use the "OTHER WINDOW OF ABSENCE" section. The other window of absence boxes may be used where an employee may be periodically absent during the workday for some other reason. For example in a union shop where a union steward is required to attend a union meeting between the hours of 2–3 pm on the first Wednesday of every month, then the supervisor would click on the out box 222 and enter 1 pm followed by clicking on the in box 226 and entering 2 pm. Deviations may be entered in the sign-on and sign-off boxes 224, 228. To complete the process, the supervisor may click on Wednesday in the weekly boxes 212 and week number 1 in the monthly boxes 214.

To create a number of exception deviation profiles, the supervisor may use the enter box 230 in the lower left corner of the exception section. After each periodic exception, the supervisor may create a new periodic exception and click the enter box 230. Activation of the enter box 230 causes the information of the default and exception deviation profiles to be stored in a file of the agent being profiled.

To create a work schedule for the ACD system 10, the supervisor activates a schedule application 15 in the server 16. Activation of the schedule application 15 may cause a graphic representation of a schedule period (e.g., 14 days) to be shown on a display 19 of the terminal 18 of the supervisor. The supervisor may create the work schedule by clicking on a particular day of the schedule period and entering identifiers of agents to be scheduled for that day of the schedule period. The process may be repeated for each day of the scheduling period. The completed schedule may then be exported to the CPU 32 for use during that schedule period.

Deviation profiles may be imported from the databases 20, 24 into the schedule during creation, or the ACD 22 may import the deviation profiles for each agent during use. Under one embodiment, the deviation schedules for each agent are imported into the schedule and used in a graphics program to show an agent staffing level for each hour of the work day for the scheduling period as an aid to the supervisor in creating the work schedule.

During the schedule period, the CPU 32 uses the list of agents from the work schedule as a basis for a table of available agents for assignment of incoming calls. From the work schedule, the CPU 32 knows which agents should be available during a particular day. When an agent signs on through his terminal 28, the CPU 32 adds the agent to the table of agents. Upon sign-on, the CPU 32 may also recover a list of agent attributes from an agent database 24. (The list of attributes may include deviation profiles for that particular day or the work schedule downloaded from the server 16 may include deviation profiles for each day.) The agent attributes may be used by the CPU 24 in selecting agents for incoming calls based upon the qualifications of particular agents.

Figure 2:
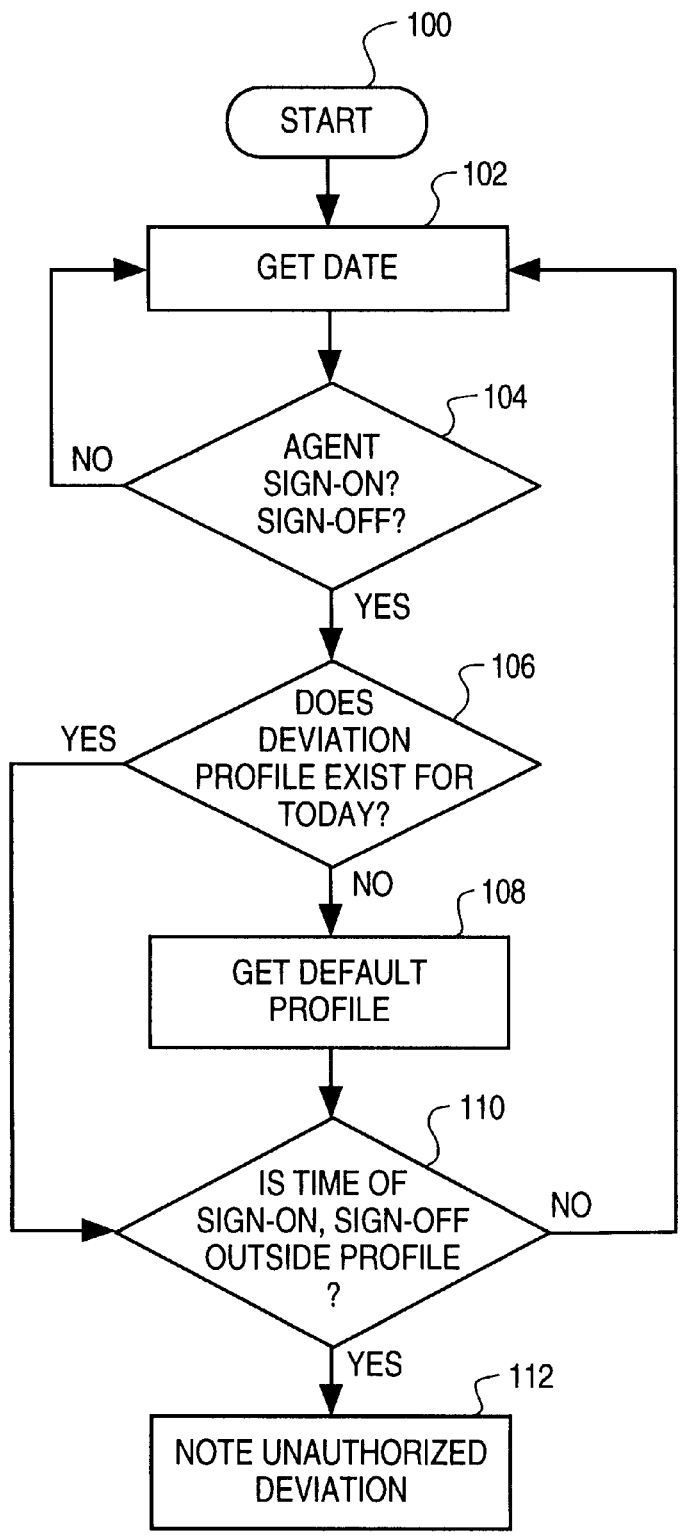
FIG. 2 depicts a flow chart of exemplary method steps of the system of FIG. 1.

Upon sign-on, the CPU 32 notes a time of sign-on and compares the time of sign-on with a scheduled time of sign-on from the work schedule. The difference is compared with the deviation profiles of the agent. FIG. 2 depicts a series of process steps that may be used in evaluating agent performance against the deviation profiles.

As a first step (FIG. 2), the CPU 32 retrieves a date 102 along with the agent list, agent attributes and agent deviation profiles. The CPU 32 then begins monitoring 104 for agent event activity (e.g., sign-on, sign-off, lack of activity, etc.). Once an agent event is detected, the CPU 32 first searches 106 for an agent deviation profile for that particular date and for a particular purpose (i.e., sign-on). For example, for sign-on, the CPU would first look 106 for an exception deviation profile for sign-on for that particular date and general time period. If the CPU 32 should find one, then the CPU 32 would use that profile and time specified.

If the CPU 32 should fail to find an exception deviation profile for that particular date, then the CPU 32 would use 108 a default sign-on deviation profile for any day. If the CPU 32 should fail to find a default sign-on deviation profile, then the CPU 32 would use the general default deviation profile 108.

In any case, the CPU 32 selects the appropriate deviation profile and compares it to the deviation detected for the event at issue. If the detected deviation is outside that permitted by the selected deviation profile, then the CPU 32 adds the detected deviation to an unauthorized deviation list maintained for the supervisor.

A specific embodiment of a method and apparatus of tracking agent work performance according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

I claim:

1. A method of scheduling agents supporting operation of an ACD, such method comprising the steps of:

establishing a scheduling period;

identifying a plurality of agents to the ACD for supporting the operation of the ACD during the scheduling period;

applying a generally periodic deviation schedule of an agent of the plurality of agents to the scheduling period which generally periodic deviation schedule is periodic over a plurality of days of the scheduling period.

2. The method as in claim 1 wherein the step of establishing the scheduling period further comprises selecting fourteen days as the scheduling period.

3. The method as in claim 1 wherein the step of establishing the scheduling period further comprises including a shift start time and a shift end time for each work day as scheduling information for the scheduling period.

4. The method as in claim 1 wherein the step of establishing the scheduling period further comprises entering the scheduling period into a processor of the ACD.

5. The method as in claim 4 wherein the step of identifying the plurality of agents further comprises entering an identifier of each agent of the plurality of agents into the processor of the ACD.

6. The method as in claim 4 wherein the step of applying a generally periodic deviation schedule further comprises importing the generally periodic deviation schedule from an agent file of a database of the ACD into the schedule for each agent of the plurality of agents.

7. The method as in claim 1 further comprising comparing a time and date of sign-on with the ACD of an agent of the plurality of agents with a corresponding time and date of the schedule and noting any difference as a deviation for the date.

8. The method as in claim 7 further comprising comparing the deviation of the agent for the time and date with an authorized deviation of a corresponding time and date of the generally periodic deviation schedule and where the difference for the date exceeds the authorized deviation determining that the deviation constitutes an unauthorized deviation.

9. The method as in claim 1 further comprising comparing a time and date of sign-off with the ACD of an agent of the plurality of agents with a corresponding time and date of the schedule and noting any difference as a deviation for the date.

10. The method as in claim 9 further comprising comparing the deviation of the agent for the time and date with an authorized deviation of a corresponding time and date of the generally periodic deviation schedule and where the difference for the date exceeds the authorized deviation determining that the deviation constitutes an unauthorized deviation.

11. Apparatus for scheduling agents supporting operation of an ACD, such apparatus comprising:

means for establishing a scheduling period;

means for identifying a plurality of agents to the ACD for supporting the operation of the ACD during the scheduling period; and means for applying a generally periodic deviation schedule of an agent of the plurality of agents to the scheduling period of the agent which generally periodic deviation schedule is periodic over a plurality of days during the scheduling period.

12. The apparatus as in claim 11 wherein the means for establishing the scheduling period further comprises means for selecting fourteen days as the scheduling period.

13. The apparatus as in claim 11 wherein the means for establishing the scheduling period further comprises means for including a shift start time and a shift end time for each work day as scheduling information for the scheduling period.

14. The apparatus as in claim 11 wherein the means for establishing the scheduling period further comprises means for entering the scheduling period into a processor of the ACD.

15. The apparatus as in claim 14 wherein the means for identifying the plurality of agents further comprises means for entering an identifier of each agent of the plurality of agents into the processor of the ACD.

16. The apparatus as in claim 14 wherein the means for applying a generally periodic deviation schedule further comprises means for importing the generally periodic deviation schedule from an agent file of a database of the ACD into the schedule for each agent of the plurality of agents.

17. The apparatus as in claim 11 further comprising means for comparing a time and date of sign-on with the ACD of an agent of the plurality of agents with a corresponding time and date of the schedule and noting any difference as a deviation for the date.

18. The apparatus as in claim 17 further comprising means for comparing the deviation of the agent for the time and date with an authorized deviation of a corresponding time and date of the generally periodic deviation schedule and where the difference for the date exceeds the authorized deviation determining that the deviation constitutes an unauthorized deviation.

19. The apparatus as in claim 11 further comprising means for comparing a time and date of sign-off with the ACD of an agent of the plurality of agents with a corresponding time and date of the schedule and noting any difference as a deviation for the date.

20. The apparatus as in claim 19 further comprising means for comparing the deviation of the agent for the time and date with an authorized deviation of a corresponding time and date of the generally periodic deviation schedule and where the difference for the date exceeds the authorized deviation determining that the deviation constitutes an unauthorized deviation.

21. Apparatus for scheduling agents supporting operation of an automatic call distributor, such apparatus comprising:
a server which establishes a scheduling period;
a terminal which identifies a plurality of agents to the automatic call distributor for supporting the operation of the automatic call distributor during the scheduling period; and
a processor of the automatic call distributor which applies a generally periodic deviation schedule of an agent of the plurality of agents to the scheduling period of the agent which generally periodic duration schedule is periodic over a plurality of days during the scheduling period.

22. The apparatus as in claim 21 wherein the server which establishes a scheduling period further comprises a scheduling application.

23. The apparatus as in claim 21 wherein the server which establishes the scheduling period further comprises a display monitor which displays a deviation entry window.

24. The apparatus as in claim 21 wherein the processor which applies the generally periodic deviation schedule further comprises a supervisor's terminal which imports the generally periodic deviation schedule into the scheduling period from a database.

25. The apparatus as in claim 21 further comprising an agent terminal which is used by the agent to sign-on in accordance with a schedule of the scheduling period.

26. The apparatus as in claim 25 wherein the processor which applies the generally periodic scheduling period further comprises a schedule comparator which compares the schedule of the agent with a sign-on time of the agent to determine a schedule deviation.

27. The apparatus as in claim 26 wherein the processor which applies the generally periodic scheduling period further comprises a deviation comparator which compares the schedule deviation of the agent with the generally periodic deviation profile for the agent and where the schedule deviation exceeds an allowed deviation of the generally periodic deviation profile generates an unauthorized deviation notice at a supervisor's terminal.

* * * * *